S. I. MERRILL, OF FALMOUTH, MAINE, ASSIGNOR TO D. U. YOUNG AND M. C. MERRILL, OF SAME PLACE.

Letters Patent No. 83,872, dated November 10, 1868.

IMPROVED MEDICAL PLASTER.

The Schedule referred to in these Letters Patent and making part of the same.

*To all whom it may concern:*

Be it known that I, S. I. MERRILL, of Falmouth, in the county of Cumberland, and State of Maine, have originated and invented a new and useful Improved Plaster; and I hereby declare the following to be a full, clear, and exact description of the same, and of the method of compounding, manufacturing, and preparing it, which will enable others to make and use my invention.

My invention consists in the combination, in the manner and proportion hereinafter mentioned, of the following ingredients, viz; resin, mutton-tallow, beeswax, fir-balsam, alcohol, and fir-oil.

These ingredients I mix together by a moderate heat, until they are prepared for spreading upon sheets, or running into rolls for hardening, packing, &c.

The proportions of my mixture I will state as follows, for the amount of twelve pounds of the plaster:

Resin, twelve pounds; mutton-tallow, one pound; beeswax, four ounces; fir-balsam, two fluid ounces; alcohol, four fluid ounces; fir-oil, one-half of a fluid ounce.

The alcohol and fir-oil are first mixed together, and the other ingredients are melted and added, the compound constituting a plaster, which is adhesive, strengthening, and healing in its character.

The solid parts of the mixture are melted, and the whole interfused by the application of heat, and the compound is prepared for use and sale.

What I claim as my invention, and desire to secure by Letters Patent, is—

The above-described compound of ingredients, in the named proportion, for the purposes set forth.

S. I. MERRILL.

Witnesses:
E. N. TUKESBURY,
A. MERRILL.